US007070377B2

(12) United States Patent
Fonville

(10) Patent No.: US 7,070,377 B2
(45) Date of Patent: Jul. 4, 2006

(54) GROMMET BRIDGE ASSEMBLY

(75) Inventor: Carl E. Fonville, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/912,296

(22) Filed: Aug. 5, 2004

(65) Prior Publication Data

US 2006/0029486 A1 Feb. 9, 2006

(51) Int. Cl.
*F16B 43/00* (2006.01)

(52) U.S. Cl. .......................... 411/84; 411/531; 411/544

(58) Field of Classification Search .................. 411/84, 411/85, 92–97, 369, 531, 544, 546
See application file for complete search history.

(56) References Cited

U.S. PATENT DOCUMENTS 2,560,092 A * 7/1951 La Mater .................... 220/681
3,596,656 A * 8/1971 Kaute .......................... 606/65
4,303,362 A * 12/1981 Lockhart .................... 411/153
4,306,708 A * 12/1981 Gassaway et al. ....... 267/141.3
4,587,377 A * 5/1986 Rodseth ..................... 174/16.3
4,732,519 A * 3/1988 Wagner ...................... 411/337
5,397,206 A * 3/1995 Sihon ......................... 411/544
6,591,801 B1 * 7/2003 Fonville ................. 123/90.38

* cited by examiner

*Primary Examiner*—Flemming Saether
(74) *Attorney, Agent, or Firm*—Christopher DeVries

(57) ABSTRACT

A grommet bridge assembly includes a grommet bridge having at least one grommet-receiving aperture disposed therein and a plurality of grommets. Each of the grommet-receiving apertures is shaped for engaging at least a portion of one of the grommets. The grommet bridge assembly also includes a fastener-receiving aperture and an elongated fastener that is fitted through the fastener-receiving aperture and fitted through one of the grommets. At least a portion of each of the other grommets is received in each of the grommet-receiving apertures.

16 Claims, 2 Drawing Sheets

GROMMET BRIDGE ASSEMBLY

TECHNICAL FIELD

This invention relates to grommet assemblies, and more particularly to grommet assemblies for use with internal combustion engine assemblies and subassemblies.

BACKGROUND OF THE INVENTION

According to conventional methodology, in order to obtain additional hold-down force from a bolt and grommet assembly, it is necessary to modify the design or to add an additional bolt and grommet assembly. More simply, conventionally if it is desired to add a grommet to an assembly, an additional bolt is correspondingly added with the grommet.

For instance, single bolt and grommet assemblies may be used to hold down a cover and provide proper load for a gasket located between the cover and an assembly body to thereby form a seal. In some cases, a single bolt and grommet assembly may be overloaded, because the grommet provides insufficient load for a large span of gasket, because the gasket requires more reaction load to form a seal than a single grommet can provide, or because of some other reason. In the case that a single bolt and grommet assembly is overloaded, additional grommet load is needed at that location.

Conventionally, one would relocate the first bolt and add an additional bolt and grommet assembly to that location in order to provide the desired additional loading. Addition of a second bolt, however, may not be practicable. Adding a second bolt may require recasting of the assembly body, additional drill and tap machining operations, and possibly a new gasket and a redesigned cover. Hence, addition of a second bolt and grommet assembly to gain additional grommet load would require redesign of the surrounding structure (s) to allow it/them to accept a second bolt.

SUMMARY OF THE INVENTION

The present invention provides a grommet bridge assembly for adding additional grommets to a grommet and bolt assembly without the need for additional bolts. The grommet bridge assembly is more desirable than adding an additional bolt assembly since it does not require assembly body recasting, an additional drill and tap machining operation, a new gasket, or the redesign of the cover. The additional grommet(s) reduce the effect of compression set for all the grommets at the location, reduce localized deflection of the cover and reduce stress in the cover material. Further, a grommet bridge assembly in accordance with the present invention may achieve improved noise isolation as a result of the lower compression achieved.

The grommet bridge assembly allows for the loading of multiple grommets with a single bolt, achieving additional grommet load without adding additional bolts. A grommet bridge assembly in accordance with the present invention includes a grommet bridge having at least one grommet-receiving aperture spaced from a fastener (such as a bolt, screw, clamp, or other hold down device) and a plurality of grommets. Each of the grommet-receiving apertures is shaped so as to be capable of engaging at least a portion of one of the grommets. The grommet bridge assembly also includes a fastener-receiving aperture and an elongated fastener fitted through the fastener-receiving aperture of the bridge and fitted through one of the grommets (or between a set of grommets). At least a portion of each of the other grommets is received in each of the grommet-receiving apertures.

In one embodiment, the number of apertures in the grommet bridge may be equal to the number of grommets. The fastener may include an annular flange larger in diameter than the fastener-receiving aperture in the bridge. The grommet bridge assembly may also include three grommets and the fastener-receiving aperture may be located in between two grommet-receiving apertures. The grommets may be arranged such that the grommet receiving the fastener is inverted relative to the other grommets. Each grommet may include a compression limiter. The grommet bridge may be a generally cubical block shaped member and the apertures in the bridge may be generally arranged in a line.

These and other features and advantages of the invention will be more fully understood from the following description of certain specific embodiments of the invention taken together with the accompanying drawings.

DESCRIPTION OF THE PREFERRED EMBODIMENT

Figure 1:
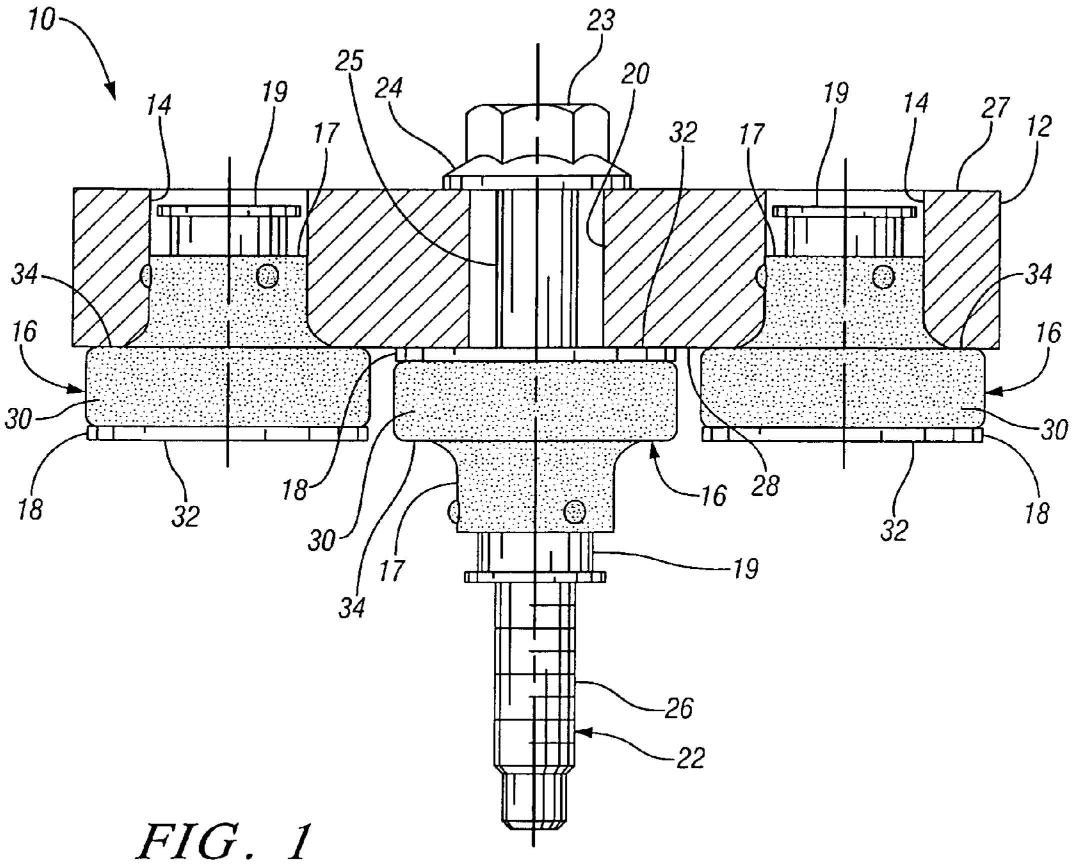
FIG. 1 is a side view of a grommet bridge assembly in accordance with the present invention showing a grommet bridge in cross section to illustrate its interior configuration.
Figure 2:
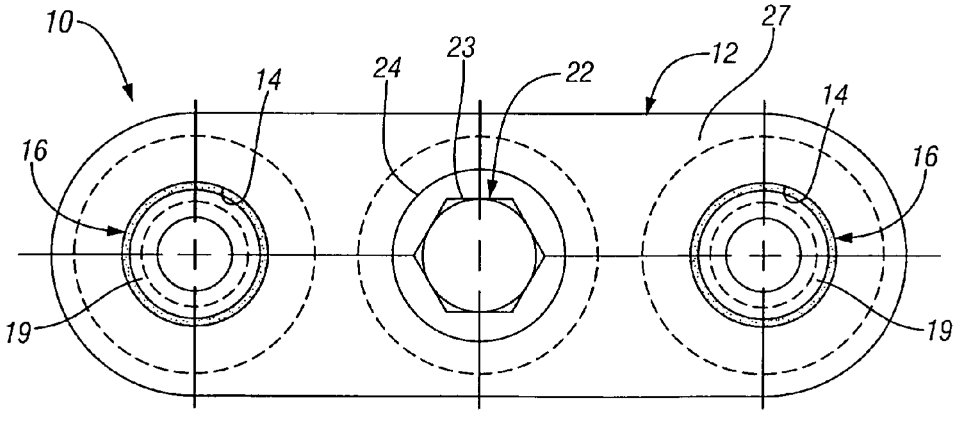
FIG. 2 is a plan view of the grommet bridge assembly of FIG. 1.
Figure 3:
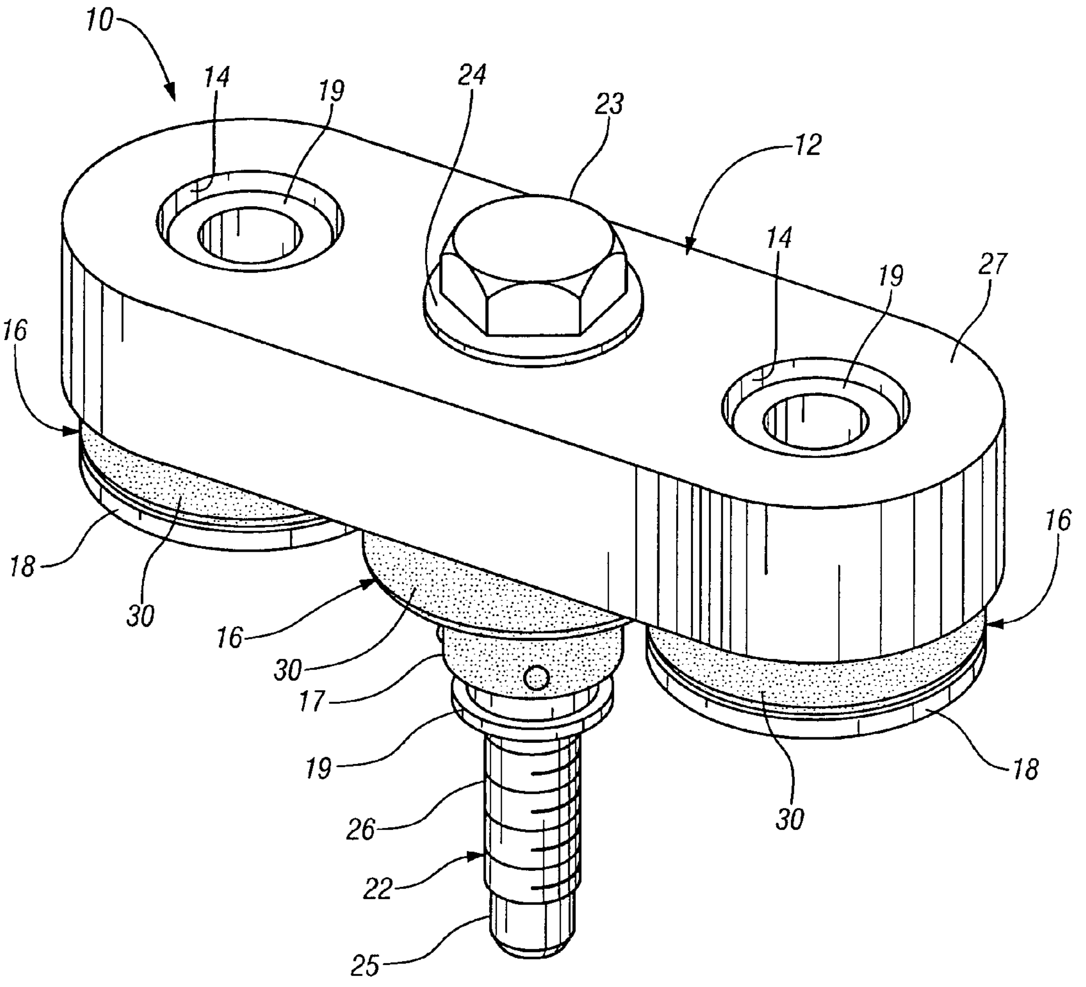
FIG. 3 is an isometric pictorial view of the grommet bridge assembly of FIG. 1.

Referring now to the drawings in detail, numeral 10 generally indicates a grommet bridge assembly in accordance with the present invention. The grommet bridge assembly 10 provides for the loading of multiple grommets with a single bolt, achieving additional grommet load without adding additional bolts while providing reduced loading of the additional grommets.

The grommet bridge assembly 10 includes a grommet bridge 12 having at least one grommet-receiving aperture 14 disposed therein and a plurality of grommets 16. Each of the grommet-receiving apertures 14 is shaped so as to be capable of engaging and positioning an end portion 17 of one of the grommets 16. The grommet bridge 12 may be constructed of any suitable material, such as a metallic material, for example steel. The grommets 16 may be any type of resilient grommet suitable for the desired application of the grommet bridge assembly. The grommets 16 may also include a load washer 18 and a compression limiter sleeve 19.

The grommet bridge assembly 10 also includes a fastener-receiving aperture 20. An elongated fastener 22 is fitted through the fastener-receiving aperture 20 and fitted through an additional one of the grommets 16 having no portion received within the fastener-receiving aperture. In the case that the grommet 16 includes a compression limiter sleeve 19, the fastener 22 is also fitted through the limiter sleeve 19 of the grommet 16. The end portions 17 of the remaining grommets 16 are received in the grommet-receiving apertures 14.

The fastener 22 may be a bolt that preferably includes a head 23 with an annular flange 24 larger in diameter than the fastener-receiving aperture 20. The fastener 22 preferably has a shank 25 that is longer than a fastener used in a conventional single grommet and fastener assembly, since in the grommet bridge assembly 10, the fastener shank 25 must pass through the grommet bridge 12 in addition to one of the grommets 16. The end of the shank may form an attaching portion 26 that may be threaded for attachment with an associated structure. The grommet bridge 12 may be a generally cubical block shaped member having first (upper) 27 and second (lower) 28 sides and the apertures 14, 20 in the bridge may be generally arranged in a line. The fastener-receiving aperture 20 extends through the bridge between the first and second sides 26, 28. The grommet-receiving apertures 14 may similarly extend through the bridge or they may be blind recesses extending through only the second (lower) side 28. There may be as many apertures 14, 20 in the grommet bridge 12 as there are grommets 16. The grommet bridge assembly 10 may include specifically three grommets 16, wherein the fastener-receiving aperture 20 is located in between two grommet-receiving apertures 14. The grommets 16 may be arranged such that the grommet 16 receiving the fastener 22 is inverted relative to the other grommets.

All the grommets 16 may be identical and interchangeable and include a compressible central portion 30 connecting with axially opposite first 17 and second 32 end portions. The first end portion 17 may be of reduced diameter for entry into a grommet-receiving aperture. The second end portion may be generally flat for load transmitting engagement with an exterior surface. A part 34 of the central portion 30 extends outward of the first end portion 17 and is generally flat to engage an external surface, sigh as the lower second side 28 of the grommet bridge 12. The grommets may also include a load washer 18 and a compression limiter sleeve 19, however, these could be omitted from the grommets in the grommet-receiving apertures 14 of the bridge if not needed. However, this would negate the advantages of using only identical grommets in the grommet bridge assembly.

Alternatively, the grommet bridge 12 may be any desired shape useful for a specific application of the grommet bridge assembly 10, such as X-shaped, Y-shaped, square shaped, or similar. Further, the grommet bridge assembly 10 may include any number of grommets 16 and any number of grommet-receiving apertures 14. The fastener 22 is capable of supporting the load of a numerous quantity of grommets 16. However, it may be desirable to have a symmetrical pattern of grommets 16 about the fastener 22. In other words, it may be desirable to have a two-dimensionally symmetric pattern of equally loaded grommets 16 in the grommet bridge assembly 10 in order for the assembly to be balanced at the fastener 22. For example, a linear arrangement of three grommets equally spaced and loaded 16 is two-dimensionally symmetric; therefore, it is stable and desirable. An asymmetric pattern of grommets 16 may be undesirable if it is unstable, but such asymmetric patterns are not excluded from the present invention.

When in use on a member of a structure, the multiple grommets 16 of the grommet bridge assembly 10 provide additional grommet load in order to hold the member in engagement with the structure. Further, the compression on each individual grommet 16 is reduced in comparison to a single grommet and fastener assembly. The fastener 22 and its corresponding grommet 16 may be fitted through a hole in the member used for a single grommet and fastener assembly. Therefore, there is no need to drill a new hole. The additional grommets 16, held in the apertures 14, are compressed against the surface of the member, thereby providing additional load.

In a specific example, the grommet bridge assembly 10 may be used to hold down a rear end of a rocker arm cover of an internal combustion engine to a cylinder head of the engine. In a conventional assembly, a single grommet and fastener assembly would hold down the rear end of the rocker arm cover and compress a rear portion of a cover gasket. The single grommet and fastener assembly, however, may be overloaded, while the gasket between the rocker arm cover and the cylinder head may be underloaded. This may cause the rocker arm cover seal to allow oil seepage. To change the loading, the grommet bridge assembly 10 may be used in place of the single grommet and fastener assembly.

The fastener 22 of the grommet bridge assembly 10 and its corresponding grommet 16 may be fitted through a hole in the rear end of the rocker arm cover originally intended and sized for a single grommet and fastener assembly using the same type grommet. The additional grommets 16 held in the bridge grommet-receiving apertures 14 are compressed against the outer surface of the rocker arm cover. Use of the grommet bridge assembly 10 to obtain additional grommet load is desirable over the use of two single grommet/fastener assemblies (a "two bolt design") because a two bolt design would require relocating the first bolt, drilling an additional hole in the rocker arm cover and recasting of the cylinder head, along with other necessary retooling. Because all the designs use identical grommets, use of the grommet bridge assembly does not require the use of a new or different type of grommet. Use of identical grommets common with the single bolt and grommet assembly is more desirable due to pre-existing tooling and load data for the grommet. It is not, however, a required feature of the invention.

In comparison to the use of a single grommet and fastener assembly, as well as to the use of a two bolt design, the grommet bridge assembly 10 is as much, if not more, of an improvement over the single grommet/fastener assembly as the two bolt design. The compression on the individual grommet in the single grommet/fastener assembly is 37.9%, while in the two bolt design the compression on the individual grommets is 30.6% and in the grommet bridge assembly it is 30.8%. The perimeter gasket compression at the rear end of the rocker arm cover assembly is 12.5% for the single grommet/fastener assembly, 17.0% for the two bolt design, and 18.2% for the grommet bridge assembly. Rear spark plug gasket compression in the rocker arm cover assembly is 11.5% for the single grommet/fastener assembly, 13.7% for the two bolt design, and 13.7% for the grommet bridge assembly.

The grommet bridge assembly increases the load on the rear end of the rocker arm cover by 100%, doubling the force provided by a single grommet/fastener assembly. By reducing the grommet loading, the grommet bridge assembly also reduces the grommet compression set, which leads to improved noise isolation over the other designs. Hence, the grommet bridge assembly is at least as effective as the two bolt design in holding down the rocker arm cover without the additional structural costs that are necessary for the two bolt modification.

The term "grommet-receiving aperture(s)" as used in the specification and claims is intended to include blind recesses and other equivalent openings into which grommets may be received.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A grommet bridge assembly comprising:

a grommet bridge;

said grommet bridge having a plurality of grommet-receiving apertures disposed in said bridge;

a plurality of grommets;

each of said grommet-receiving apertures being shaped to engage at least a portion of one of said grommets;

a fastener-receiving aperture; and an elongated fastener fitted through said fastener-receiving aperture of said bridge and fitted through one of said grommets having no portion received within the fastener-receiving aperture;

wherein at least a portion of each of the other grommets is received without a fastener in a respective one of said grommet-receiving apertures.

2. The grommet bridge assembly of claim 1, wherein the number of said apertures in said grommet bridge is equal to the number of said grommets.

3. The grommet bridge assembly of claim 1, wherein said fastener includes an annular flange larger in diameter than said fastener-receiving aperture in said bridge.

4. The grommet bridge assembly of claim 1, wherein said grommet bridge assembly includes three grommets; and said fastener-receiving aperture is located intermediate two grommet-receiving apertures.

5. The grommet bridge assembly of claim 1, wherein said grommets are arranged such that said grommet receiving said fastener is inverted relative to the other grommets.

6. The grommet bridge assembly of claim 1, wherein said grommet bridge is a generally cubical block shaped member.

7. The grommet bridge assembly of claim 1, wherein said apertures in said bridge are generally arranged in a line.

8. The grommet bridge assembly of claim 1, wherein each of said grommets includes a compression limiter.

9. A grommet bridge assembly comprising:

a grommet bridge having opposite first and second sides, a single fastener-receiving aperture in the bridge extending through the opposite sides, and a plurality of grommet-receiving apertures extending into the bridge from the second side and spaced about the fastener-receiving aperture;

a fastener engaging the first side of the bridge and extending through the fastener aperture and beyond the second side with an attaching portion for attachment to an associated structure; and a plurality of similar grommets, each having a compressible central portion connecting with axially opposite first and second end portions, the first end portions being of reduced diameter adapted for entry into grommet-receiving apertures and the second end portions being generally flat for load transmitting engagement with an exterior member;

one of said grommets being received on said fastener with its flat end engaging the bridge second side, its reduced diameter end protruding for reception into a grommet-receiving aperture of the associated structure, and a part of its central portion, surrounding the reduced diameter portion, being positioned for load transmitting engagement with a member, and others of said grommets having their reduced diameter ends received in the grommet-receiving apertures of the bridge and their flat ends protruding for load transmitting engagement with the member.

10. The grommet bridge assembly of claim 9 wherein the flat ends of the grommets are defined by a load washer.

11. The grommet bridge assembly of claim 10 wherein said one of the grommets includes a load limiter

12. The grommet bridge assembly of claim 11 wherein all the grommets are identical and interchangeable.

13. The grommet bridge assembly of claim 12 wherein the fastener is a bolt having a flanged head engaging the first side of the grommet bridge and a shank extending through the fastener opening and said one of the grommets, and the attaching portion is threaded.

14. The grommet bridge assembly of claim 9 wherein the grommets received in the grommet-receiving apertures of the grommet bridge are positioned relative to the fastener opening to provide a balanced load on the fastener when assembled with an associated structure.

15. The grommet bridge assembly of claim 9 wherein the bridge includes only two grommet-receiving apertures aligned with and spaced equal distances on opposite sides of the fastener-receiving opening to provide balanced loading of the fastener.

16. The grommet bridge assembly of claim 9 wherein the grommet-receiving openings extend through the opposite sides of the grommet bridge.

* * * * *